United States Patent
Li et al.

(10) Patent No.: US 9,540,268 B2
(45) Date of Patent: Jan. 10, 2017

(54) METHOD FOR TREATING HIGHLY CONCENTRATED RESIN-DESORPTION LIQUID GENERATED FROM WASTEWATER DEEP PURIFICATION

(75) Inventors: Aimin Li, Jiangsu (CN); Ling Xu, Jiangsu (CN); Jun Fan, Jiangsu (CN); Bicun Jiang, Jiangsu (CN); Danning Jiang, Jiangsu (CN)

(73) Assignee: NANJING UNIVERSITY (CN)

( * ) Notice: Subject to any disclaimer, the term of this patent is extended or adjusted under 35 U.S.C. 154(b) by 199 days.

(21) Appl. No.: 13/988,512

(22) PCT Filed: Aug. 12, 2011

(86) PCT No.: PCT/CN2011/078362
§ 371 (c)(1),
(2), (4) Date: May 21, 2013

(87) PCT Pub. No.: WO2012/068906
PCT Pub. Date: May 31, 2012

(65) Prior Publication Data
US 2013/0240450 A1    Sep. 19, 2013

(30) Foreign Application Priority Data
Nov. 24, 2010 (CN) .......................... 2010 1 0556705

(51) Int. Cl.
| | | |
|---|---|---|
| C02F 1/42 | (2006.01) | |
| C02F 1/44 | (2006.01) | |
| C02F 1/52 | (2006.01) | |
| C02F 1/72 | (2006.01) | |
| C02F 1/78 | (2006.01) | |
| C02F 3/12 | (2006.01) | |
| C02F 9/00 | (2006.01) | |

(52) U.S. Cl.
CPC . *C02F 9/00* (2013.01); *C02F 1/42* (2013.01); *C02F 1/442* (2013.01); *C02F 1/52* (2013.01); *C02F 1/5209* (2013.01); *C02F 1/5236* (2013.01); *C02F 1/5245* (2013.01); *C02F 1/72* (2013.01); *C02F 1/722* (2013.01); *C02F 1/725* (2013.01); *C02F 1/78* (2013.01); *C02F 3/12* (2013.01); *C02F 3/1215* (2013.01); *C02F 2209/06* (2013.01); *C02F 2305/02* (2013.01); *C02F 2305/026* (2013.01); *Y02W 10/15* (2015.05)

(58) Field of Classification Search
CPC ............... C02F 9/00; C02F 1/42; C02F 1/442; C02F 1/722; C02F 1/725; C02F 1/72; C02F 1/78; C02F 1/52; C02F 1/5245; C02F 1/5236; C02F 1/5209; C02F 3/12; C02F 3/1215; C02F 2209/06; C02F 2305/026; Y02W 10/15
See application file for complete search history.

(56) References Cited

U.S. PATENT DOCUMENTS

| | | | | |
|---|---|---|---|---|
| 3,462,275 A | * | 8/1969 | Bellamy | .......................... 426/53 |
| 3,773,659 A | * | 11/1973 | Carlson | ..................... C02F 3/02 |
| | | | | 119/161 |
| 4,537,682 A | * | 8/1985 | Wong-Chong | ................ 210/611 |
| 5,308,492 A | * | 5/1994 | Loew et al. | .................. 210/631 |
| 2005/0274678 A1 | * | 12/2005 | Chen et al. | .................... 210/722 |

FOREIGN PATENT DOCUMENTS

| | | | |
|---|---|---|---|
| CN | 101514058 A | | 8/2009 |
| CN | 101659457 A | * | 3/2010 |
| JP | 50053287 A | | 5/1975 |
| JP | 11565 A | | 1/1999 |

OTHER PUBLICATIONS

International Search Report; PCT/CN2011/078362; Int'l File Date: Aug. 12, 2011; Nanjing University, 3 pages.

* cited by examiner

*Primary Examiner* — Lucas Stelling
*Assistant Examiner* — Angel Olivera
(74) *Attorney, Agent, or Firm* — Schmeiser, Olsen & Watts, LLP

(57) ABSTRACT

A method for treating highly concentrated resin-desorption liquid generated from wastewater deep purification, including channeling the highly concentrated desorption liquid generated from anion exchange resin treatment through a nanofiltration membrane, the liquid being separated into nanofiltration permeate that can be reused as the desorption agent and highly concentrated nanofiltration retentate; adding a coagulating agent to the highly concentrated nanofiltration retentate to generate coagulation-precipitation; subjecting the supernatant formed after the coagulation-precipitation process to Fenton oxidation or ozone oxidation; after the reaction, adding to the liquid an alkali solution for further coagulation-precipitation; then channeling the liquid so treated back to the biochemical system of biochemical effluent treatment for further biodegradation is provided. The recycled treatment of the highly concentrated desorption liquid consequently reduces the treatment cost and prevents secondary pollution by realizing innocuous treatment and reclamation of resin-desorption liquid as well as reduction of its total volume.

15 Claims, No Drawings

METHOD FOR TREATING HIGHLY CONCENTRATED RESIN-DESORPTION LIQUID GENERATED FROM WASTEWATER DEEP PURIFICATION

FIELD OF TECHNOLOGY

This invention relates to a method for treating resin-desorption liquid, specifically to a method for treating highly concentrated resin-desorption liquid generated from the wastewater deep purification that adopts anion exchange resin.

BACKGROUND

China's fine chemical industry has experienced soaring development and contributed enormously to its national economy since it adopted reform and opening-up policy. However, the wastewater discharged by this industry is complicatedly constituted, highly concentrated and toxic, deep in color and hard to be biodegradated. It has caused severe pollution to the ecosystem and the environment as a whole. Therefore, it is urgent to find appropriate methods for treating this kind of wastewater.

Biotechnology is the most economical way in wastewater treatment, however, it may leave residual metabolites of microorganisms and their decomposition products, toxic substances that cannot be degraded by microorganisms and various inorganics in the wastewater, which requires a deep treatment procedure to ensure that the discharged wastewater reaches the state environmental standards. Resin adsorption is one of the most widely used technologies in the wastewater deep treatment field. This method has such advantages as high adsorption capacity, desirable mechanical properties and capability of recycled use. However, when adopting resin adsorption to treat biochemical effluent, there would be a large amount of desorption liquid, which is complicatedly constituted, highly concentrated and toxic, deep in color and hard to be biodegradated. These properties make treatment of desorption liquid a great challenge widely recognized in the environmental protection field, and restrict the application of resin in various industries as well. Therefore, it is very urgent to find out a cheaper and more efficient method for treating the desorption liquid.

Currently, the most common methods for treating the desorption liquid include enhanced coagulation, catalytic oxidation, catalytic reduction and membrane filtration. The coagulation method presents great efficiency in removing hydrophobic large molecules, but its performance in removing polar organic small molecules is limited. This means the desorption liquid treated with this method cannot directly meet the discharge standards. In addition, this method also results in large consumption of coagulating agent and a large amount of sludge. The catalytic oxidation method is essentially a kind of advanced oxidation process. It presents many advantages such as complete degradation, no secondary pollution, low energy and raw material consumption; however, the Fenton oxidation method requires precise control of pH value while the ozone oxidation requires large construction investment and high operation expenses. Insofar as the membrane filtration method is concerned, the membrane adopted therein presents such defects as high cost in manufacturing and being easy to be contaminated. Therefore, separate exploitation of above-mentioned methods can hardly realize economical and efficient treatment of desorption liquid; a combined method that integrates two or more methods is of great necessity.

SUMMARY

1. The Technical Problems to be Solved

Due to the wide use of resin adsorption technology, a large amount of resin-desorption liquid generated therein requires to be properly treated, however, the various methods in the prior arts are unable to achieve highly effective treatment of the desorption liquid. The present invention provides a new method that integrates coagulation and advanced oxidation for treating and recovering highly concentrated resin-desorption liquid generated from magnetic anion exchange resin treatment of biochemical effluent; it can remove most of TOC and $UV_{254}$ in the nanofiltration retentate, increase the ratio of $BOD_5/COD_{cr}$ and guarantee the stability of the biochemical effluent; the difficult technical problem caused by highly concentrated resin-desorption liquid is therefore successfully solved.

2. Technical Solutions a method for treating highly concentrated resin-desorption liquid generated from wastewater deep purification, comprising the following steps:
1) channeling the highly concentrated desorption liquid generated from anion exchange resin treatment of the biochemical effluent through a nanofiltration membrane for separation; keeping the operation pressure at 1.0-2.5 MPa and the liquid is separated into nanofiltration permeate containing small-molecule substances and nanofiltration retentate containing mainly big-molecule organics; the volume of the nanofiltration retentate is about ½ of that of the highly concentrated desorption liquid, and the nanofiltration permeate can be reused as the desorption agent after oxidation;
2) adding a coagulating agent to the nanofiltration retentate to generate coagulation-precipitation; the coagulating agent is $FeCl_3 \cdot 6H_2O$, $FeSO_4 \cdot 7H_2O$, $Al_2(SO_4)_3 \cdot 18H_2O$ or polyaluminum chloride (PAC); the mass percentage of the coagulating agent is 1%-5%, and the pH value of the solution obtained after coagulation-precipitation is 2-5; the removal percentage of total organic carbon (TOC) reaches 35%-55%;
3) subjecting the supernatant obtained after the coagulation-precipitation in step 2) to Fenton oxidation or ozone oxidation; the mass percentage of added $FeSO_4 \cdot 7H_2O$ is 0.1%-2% and the mass percentage of added 30% (by weight) $H_2O_2$ solution is 1%-4%; the concentration of ozone pumped therein is 3 mg/L-10 mg/L; after 1-5 hours of reaction, the removal percentage of TOC is 60%-80%;
4) adding NaOH or $Ca(OH)_2$ solution to the oxidation liquid obtained in step 3) and adjusting its pH value to 8.5-10.5; after further coagulation-precipitation, the ratio of $BOD_5/COD_{cr}$ increases to 0.4 or even higher;
5) channeling the liquid obtained in step 4) to a simulated biochemical system of activated sludge for further treatment.

In step 5, the concentration of inflow COD is 200-400 mg/L; adding in the liquid obtained in step 4) (namely, after the coagulation process caused by the alkali solution) and keeping its volume 1%-5% of that of the inflow; after 12-18 hours of treatment, the removal percentage of outflow COD is 40%-65%. Even so, the activated sludge can still function well in further treating this treated water; it can be channeled back to the biochemical system of biochemical effluent treatment for further biodegradation. Thus, the recycled treatment of the highly concentrated desorption liquid is realized.

The coagulating agent used in step 2) is $FeCl_3 \cdot 6H_2O$, $FeSO_4 \cdot 7H_2O$, $Al_2(SO_4)_3 \cdot 18H_2O$ or polyaluminum chloride (PAC). The mass percentage of the coagulating agent in the solution is 1%-5%. The pH value of the solution after coagulation-precipitation is 2-5.

In step c), the mass percentage of $FeSO_4 \cdot 7H_2O$ in the solution is 0.1%-2%. The mass percentage of 30% (by weight) $H_2O_2$ solution in the Fenton reagent is 1%-4%. The concentration of the ozone is 3 mg/L-10 mg/L.

The alkali solution used in step 4) is NaOH or $Ca(OH)_2$ solution.

3. Beneficial Effects

This invention discloses a method for treating highly concentrated resin-desorption liquid generated from wastewater deep purification; it adopts a nanofiltration membrane to separate the resin-desorption liquid into two parts: nanofiltration permeate and nanofiltration retentate; the nanofiltration permeate can be reused as the desorption agent after oxidation, while the nanofiltration retentate is pretreated by combined processes including coagulation, oxidation and re-coagulation; after the pretreatment, most of TOC, $UV_{254}$ in the nanofiltration retentate is removed and the ratio of $BOD_5/COD_{cr}$ increases to 0.4 or even higher; the pretreated liquid is then further treated by activated sludge. After the treatment processes mentioned above, the nanofiltration retentate can be channeled back to the biochemical system of biochemical effluent treatment so that better treatment effect can be achieved. The present method can be widely used in the treatment of highly concentrated desorption liquid generated from anion exchange resin treatment of biochemical effluent.

DETAILED DESCRIPTION

This invention is more specifically described in the following embodiments

Embodiment 1

The anion exchange resin is adopted for deep treatment of effluent generated from the biochemical treatment of dyeing wastewater, which results in a large amount of resin-desorption liquid. Channeling the resin-desorption liquid through a nanofiltration membrane and the nanofiltration retentate (TOC=3000 mg/L, pH=9.0-10.5) is therefore obtained; adding in 1% (by weight) of $FeCl_3 \cdot 6H_2O$ solution for coagulation-precipitation, and the supernatant so obtained is subject to Fenton oxidation wherein 0.1% (by weight) of $FeSO_4 \cdot 7H_2O$ and 1% (by weight) of 30% $H_2O_2$ solution are added to the supernatant; after 3 hours of Fenton reaction, adding $Ca(OH)_2$ emulsion to the oxidation liquid to generate another around of coagulation-precipitation and to adjust pH value at 8.5; after 0.5 hour of precipitation, the removal percentage of TOC in the treated liquid is 60%. After the $Ca(OH)_2$ coagulation process mentioned above, channeling the treated liquid to an activated sludge system for further treatment. The concentration of inflow COD is 200 mg/L and the volume of treated liquid is 1% of that of biochemical effluent; after 12 hours of treatment, the removal percentage of outflow COD is 40%. The repeated experiments have proven that the treated liquid can be channeled back to the biochemical system of biochemical effluent treatment for further biodegradation so that the recycled treatment of the highly concentrated desorption liquid can be obtained.

Embodiment 2

Channeling the resin-desorption liquid through a nanofiltration membrane and the nanofiltration retentate (TOC=3500 mg/L, pH=9.0-10.5) is therefore obtained; adding in 5% (by weight) of $Al_2(SO4)_3 \cdot 18H_2O$ solution for coagulation-precipitation, and the supernatant so obtained is subject to Fenton oxidation wherein 0.5% (by weight) of $FeSO_4 \cdot 7H_2O$ and 1% (by weight) of 30% $H_2O_2$ solution are added to the supernatant; after 3 hours of Fenton reaction, adding NaOH solution to the oxidation liquid to adjust pH value at 9.5; after 0.5 hour of precipitation, the removal percentage of TOC in the treated liquid is 80%. After the NaOH coagulation process mentioned above, channeling the treated liquid to an activated sludge system for further treatment. The concentration of inflow COD is 200 mg/L and the volume of treated liquid is 1% of that of biochemical effluent; after 12 hours of treatment, the removal percentage of outflow COD is 40%. The repeated experiments have proven that the treated liquid can be channeled back to the biochemical system of biochemical effluent treatment for further biodegradation so that the recycled treatment of the highly concentrated desorption liquid can be obtained.

Embodiment 3

Channeling the resin-desorption liquid through a nanofiltration membrane and the nanofiltration retentate (TOC=3000 mg/L, pH=9.5-10) is therefore obtained; adding in 1% (by weight) of $FeSO_4 \cdot 7H_2O$ solution for coagulation-precipitation, and the supernatant so obtained is subject to ozone oxidation wherein the concentration of ozone is 3 mg/L; after 3 hours of ozone reaction, adding $Ca(OH)_2$ emulsion to the oxidation liquid to generate another around of coagulation-precipitation and to adjust pH value at 10.5; after 0.5 hour of precipitation, the removal percentage of TOC in the treated liquid is 65% and the ratio of $BOD_5/COD_{cr}$ increases to 0.41. After the $Ca(OH)_2$ coagulation process mentioned above, channeling the treated liquid to an activated sludge system for further treatment. The concentration of inflow COD is 400 mg/L and the volume of treated liquid is 5% of that of biochemical effluent; after 18 hours of treatment, the removal percentage of outflow COD is 65%. The repeated experiments have proven that the treated liquid can be channeled back to the biochemical system of biochemical effluent treatment for further biodegradation so that the recycled treatment of the highly concentrated desorption liquid can be obtained.

Embodiment 4

Channeling the resin-desorption liquid through a nanofiltration membrane and the nanofiltration retentate (TOC=3500 mg/L, pH=9.5-10) is therefore obtained; adding in 2% (by weight) of PAC solution for coagulation-precipitation, and the supernatant so obtained is subject to ozone oxidation process wherein the concentration of ozone is 10 mg/L; after 5 hours of ozone reaction, adding NaOH solution to the oxidation liquid to generate another around of coagulation-precipitation and to adjust pH value at 9.0; after 0.5 hour of precipitation, the removal percentage of TOC in the treated liquid is 70% and the ratio of $BOD_5/COD_{cr}$ increases to 0.45. After the NaOH coagulation process mentioned above, channeling the treated liquid to an activated sludge system for further treatment. The concentration of inflow COD is 400 mg/L and the volume of treated liquid is 5% of that of biochemical effluent; after 18 hours of treatment, the removal percentage of outflow COD is 65%. The repeated experiments have proven that the treated liquid can be channeled back to the biochemical system of biochemical effluent treatment for further biodegradation so that the recycled treatment of the highly concentrated desorption liquid can be obtained.

What is claimed is:

1. A method for treating a highly concentrated resin-desorption liquid generated from a wastewater deep purification biochemical system, comprising:
   a) channeling the highly concentrated resin-desorption liquid generated from an anion exchange resin treatment of wastewater through a nanofiltration membrane and separating the highly concentrated resin-desorption liquid into a highly concentrated nanofiltration retentate and a nanofiltration permeate, wherein the nanofiltration permeate is reused as an desorption agent after oxidation;
   b) inducing a first coagulation-precipitation process by adding a coagulating agent to the highly concentrated nanofiltration retentate obtained in step a);
   c) subjecting a supernatant formed after the first coagulation-precipitation process to 1-5 hours of Fenton oxidation or ozone oxidation to obtain a solution;
   d) inducing a second coagulation-precipitation process by adding an alkali solution to the solution obtained in step c) for adjusting its pH value at 8.5-10.5;
   e) channeling a liquid obtained after the second coagulation-precipitation process of step d) to an activated sludge for further biodegradation; and
   f) channeling a liquid resulting from further biodegradation of the liquid obtained after the second coagulation-precipitation process of step d) with the activated sludge back to the wastewater deep purification biochemical system for further use in biodegradation, wherein the wastewater deep purification biochemical system uses an anion exchange resin.

2. A method for treating highly concentrated resin-desorption liquid generated from wastewater deep purification as defined in claim 1, wherein the coagulating agent used in step b) is $FeCl_3 \cdot 6H_2O$, $FeSO_4 \cdot 7H_2O$, $Al_2(SO4)_3 \cdot 18H_2O$ or polyaluminum chloride (PAC).

3. A method for treating highly concentrated resin-desorption liquid generated from wastewater deep purification as defined in claim 2, wherein in step b) a mass percentage of the coagulating agent in the highly concentrated nanofiltration retentate is 1%-5%.

4. A method for treating highly concentrated resin-desorption liquid generated from wastewater deep purification as defined in claim 3, wherein in step b) the pH value of the solution obtained after the first coagulation-precipitation process is 2-5.

5. A method for treating highly concentrated resin-desorption liquid generated from wastewater deep purification as defined in claim 1, wherein in step c) is performed by Fenton oxidation, FeSO4-7H20 is used as an oxidant for Fenton oxidation, and a mass percentage of the FeSO4-7H20 in the solution is 0.1%-2%.

6. A method for treating highly concentrated resin-desorption liquid generated from wastewater deep purification as defined in claim 1, wherein as to the Fenton reagent mentioned in step c), a mass percentage of 30% (by weight) $H_2O_2$ solution in the solution is 1%-4%.

7. A method for treating highly concentrated resin-desorption liquid generated from wastewater deep purification as defined in claim 1, wherein a concentration of the ozone used in step c) is 3 mg/L-10 mg/L.

8. A method for treating highly concentrated resin-desorption liquid generated from wastewater deep purification as defined in claim 1, wherein the alkali solution used in step d) is NaOH or $Ca(OH)_2$ solution.

9. A method for treating highly concentrated resin-desorption liquid generated from wastewater deep purification as defined in claim 1, wherein in step e), retention time in the activated sludge system is 12-18 h.

10. The method of treating highly concentrated resin-desorption liquid generated from wastewater deep purification as defined in claim 9, further wherein, after 12 hours of treatment, the removal percentage of outflow chemical oxygen demand is 40%.

11. The method of treating highly concentrated resin-desorption liquid generated from wastewater deep purification as defined in claim 9, further wherein, after 18 hours of treatment, the removal percentage of outflow chemical oxygen demand is 65%.

12. The method of treating highly concentrated resin-desorption liquid generated from wastewater deep purification as defined in claim 1, further wherein, after 0.5 hours of precipitation in step d), the removal percentage of total organic carbon is 60%.

13. The method of treating highly concentrated resin-desorption liquid generated from wastewater deep purification as defined in claim 1, further wherein, after 0.5 hours of precipitation in step d), the removal percentage of total organic carbon is 65%.

14. The method of treating highly concentrated resin-desorption liquid generated from wastewater deep purification as defined in claim 1, further wherein, after 0.5 hours of precipitation in step d), the removal percentage of total organic carbon is 70%.

15. The method of treating highly concentrated resin-desorption liquid generated from wastewater deep purification as defined in claim 1, further wherein, after 0.5 hours of precipitation in step d), the removal percentage of total organic carbon is 80%.

* * * * *